(12) United States Patent
Mathur et al.

(10) Patent No.: US 11,982,654 B2
(45) Date of Patent: May 14, 2024

(54) MASS SPECTROMETERY CALIBRANT LIQUID CONTAINER LEVEL SENSING

(71) Applicant: Thermo Finnigan LLC, SanJose, CA (US)

(72) Inventors: Raman Mathur, Mountain View, CA (US); Thi Le, San Jose, CA (US); David E. Minkler, Campbell, CA (US)

(73) Assignee: Thermo Finnigan LLC, San Jose, CA (US)

( * ) Notice: Subject to any disclaimer, the term of this patent is extended or adjusted under 35 U.S.C. 154(b) by 278 days.

(21) Appl. No.: 17/519,416

(22) Filed: Nov. 4, 2021

(65) Prior Publication Data

US 2023/0134726 A1    May 4, 2023

(51) Int. Cl.
*G01N 30/00*    (2006.01)
*G01N 30/72*    (2006.01)
*H01J 49/04*    (2006.01)

(52) U.S. Cl.
CPC ...... *G01N 30/7233* (2013.01); *H01J 49/0431* (2013.01)

(58) Field of Classification Search
CPC ............ G01N 30/7233; G01N 30/8665; H01J 49/0431; H01J 49/0009; G01F 23/68; G01F 23/76
USPC ....................................................... 73/304 C
See application file for complete search history.

(56) References Cited

U.S. PATENT DOCUMENTS 9,903,748 B1    2/2018  Lo
2007/0101811 A1*  5/2007  Nyce ......................... G01P 3/50
                                                              73/304 C \* cited by examiner

*Primary Examiner* — Michael Maskell

(57) ABSTRACT

Determining a level of a liquid in a container is described. In one aspect, a container includes a calibrant liquid used for calibrating a mass spectrometer. A conductive layer is placed to float upon the calibrant liquid, and a circuit board with electrodes is arranged around the container. A controller circuit then drives and measures various electrodes to first identify which two electrodes the level of the calibrant liquid is between, and then subsequently identify a more precise location for the level between the two electrodes.

20 Claims, 5 Drawing Sheets

MASS SPECTROMETRY CALIBRANT LIQUID CONTAINER LEVEL SENSING

TECHNICAL FIELD

This disclosure relates to sensing a level of a liquid stored in a container, and more particularly to measuring a level of a calibrant liquid stored within a container to calibrate a mass spectrometer.

BACKGROUND

A current focus of biological mass spectrometry is the identification, quantification, and structural elucidation of peptides, proteins, and related molecules. In the context of bottom-up proteomics experiments, proteins are subject to proteolytic digestion to break down into fragments of peptides which are then separated, usually with liquid chromatography (LC), before being introduced into an ion source of a mass spectrometer. Typically, the ion source for proteomics experiments implements electrospray ionization (ESI) to ionize the peptide to form ions that can be transported among components of a mass spectrometer. The ionized peptides are then detected, and a mass spectrum is generated.

Generating an accurate mass spectrum requires calibrating the mass spectrometer. Often, a calibrant liquid (with a high purity of solvents, acidic nitrile, chlorinated compounds, or other compounds) is stored in a container and fed into the mass spectrometer. Mass spectra of the calibrant liquid are generated, and the m/z range is aligned to the known masses that would be formed from the calibrant liquid.

The operator of the mass spectrometer might need to be informed to replace the calibrant if the level is too low, or to order additional calibrant in preparation of the replacement. Running out of the calibrant can be an unexpected interruption. Additionally, the calibrant liquid is expensive and, therefore, using the full (or almost full) amount stored in the container reduces the cost of experiments.

However, determining when to replace the calibrant is difficult. A manual process can be performed, but is not user-friendly. The level of the calibrant within the container can be measured using existing techniques, but obtaining a precise level is difficult.

SUMMARY

One innovative aspect of the subject matter described in this disclosure includes a method of calibrating a mass spectrometer, comprising: applying first signals having a first phase to a first measure electrode and a second measure electrode, the first and second measure electrodes arranged around a container holding a calibrant liquid and a conductive layer floating upon the calibrant liquid, the conductive layer capacitively coupled with the first and second measure electrodes, and a density of the conductive layer being lower than a density of the calibrant liquid; applying second signals having a second phase different than the first phase to the first and second measure electrodes; determining that a monitor signal from a monitor electrode capacitively coupled with the conductive floating layer has changed from the first phase to the second phase upon application of the second signal to the second measure electrode; identifying the first measure electrode being above a level of the calibrant liquid, and the second measure electrode being below the level of the calibrant liquid upon the determination that the monitor signal has changed from the first phase to the second phase; applying a third signal having the first phase to the first measure electrode, and a fourth signal having the second phase to the second measure electrode; identifying the level of the calibrant liquid between the first measure electrode and the second measure electrode by differentially adjusting an amplitude of the third signal and an amplitude of the fourth signal until a phase of the monitor signal oscillates between the first phase and the second phase; generating a calibration mass spectrum indicative of components of the calibrant liquid to facilitate calibration of the mass spectrometer; and calibrating the mass spectrometer based on the calibration mass spectrum.

In some implementations, the conductive layer includes conductive beads.

In some implementations, the conductive beads include gold-shelled polystyrene particles.

In some implementations, the first phase and the second phase are approximately 180 degrees out of phase with each other.

In some implementations, the amplitude of the third signal is decreased, and the amplitude of the fourth signal is increased when differentially adjusting the amplitudes.

In some implementations, the level of the calibrant liquid between the first measure electrode and the second measure electrode is an inverse of a ratio of the amplitudes.

Another innovative aspect of the subject matter described in this disclosure includes an apparatus for determining a level of a liquid in a container, comprising: a container having a conductive layer floating upon a liquid; a circuit board disposed around the container, and having measure electrodes and a monitor electrode arranged around the container; and a controller circuit configured to drive the measure electrodes and measure a monitor signal provided by the monitor electrode to identify a first electrode and a second electrode that a level of the liquid is in between, and further identify a location between the first electrode and the second electrode that the level of the liquid is at.

In some implementations, the identifying the first electrode and the second electrode that the level of the liquid is in between includes determining the monitor signal switched from a first phase to a second phase when a signal applied to the second electrode switches from the first phase to the second phase, the second electrode being below the level of the liquid, and the first electrode being above the level of the liquid.

In some implementations, identifying the location between the first electrode and the second electrode that the level of the liquid is at includes adjusting an amplitude a signal applied to the first electrode and an amplitude of a signal applied to the second electrode until a phase of the monitor signal oscillates between the first phase and the second phase.

In some implementations, the amplitude of the signal applied to the first electrode is decreased, and the amplitude of the signal is increased when adjusting the amplitudes.

In some implementations, the conductive layer includes conductive beads.

In some implementations, the conductive beads include gold-shelled polystyrene particles.

In some implementations, the liquid is a calibrant liquid for calibrating a mass spectrometer.

Another innovative aspect of the subject matter described in this disclosure includes an apparatus for determining a level of a liquid in a container, comprising a circuit board configured to wrap around a container having a conductive layer floating upon a liquid, and configured to have electrodes disposed around the container; and a controller circuit configured to drive the electrodes and identify a first electrode and a second electrode that a level of the liquid is in between, and further identify a location between the first electrode and the second electrode that the level of the liquid is at after identifying the first electrode and the second electrode.

In some implementations, identifying the first electrode and the second electrode that the level of the liquid is in between includes determining a signal at an electrode that is capacitively coupled to the conductive layer has switched from a first phase to a second phase when a signal applied to the second electrode switches from the first phase to the second phase, the second electrode being below the level of the liquid, and the first electrode being above the level of the liquid.

In some implementations, identifying the location between the first electrode and the second electrode that the level of the liquid is at includes adjusting an amplitude a signal applied to the first electrode and an amplitude of a signal applied to the second electrode until a phase of a monitor signal oscillates between the first phase and the second phase.

In some implementations, amplitude of the signal applied to the first electrode is decreased, and the amplitude of the signal is increased when adjusting the amplitudes.

In some implementations, the conductive layer includes conductive beads.

In some implementations, the conductive beads include gold-shelled polystyrene particles.

In some implementations, the liquid is a calibrant liquid for calibrating a mass spectrometer.

DETAILED DESCRIPTION

Some of the material described in this disclosure includes measuring a level of a liquid disposed within a container. In one example, a calibrant liquid stored in a container is dispensed into a mass spectrometer for calibration. Over time, the level of the calibrant liquid within the container lowers. As described later in this disclosure, a conductive layer is floated upon the surface of the calibrant liquid to facilitate capacitive coupling with electrodes arranged around the container. By driving and measuring electrodes in a two-step technique, the level of the calibrant liquid is accurately measured in a situation where the capacitance of the container is significantly higher than the capacitance of the calibrant liquid. In the first step, a coarse level of the calibrant liquid is determined, for example, identified as being between two horizontal electrodes arranged around the container. Next, in the second step, a fine level of the liquid is determined as a specific level between the two identified horizontal electrodes from the first step.

Figure 1:
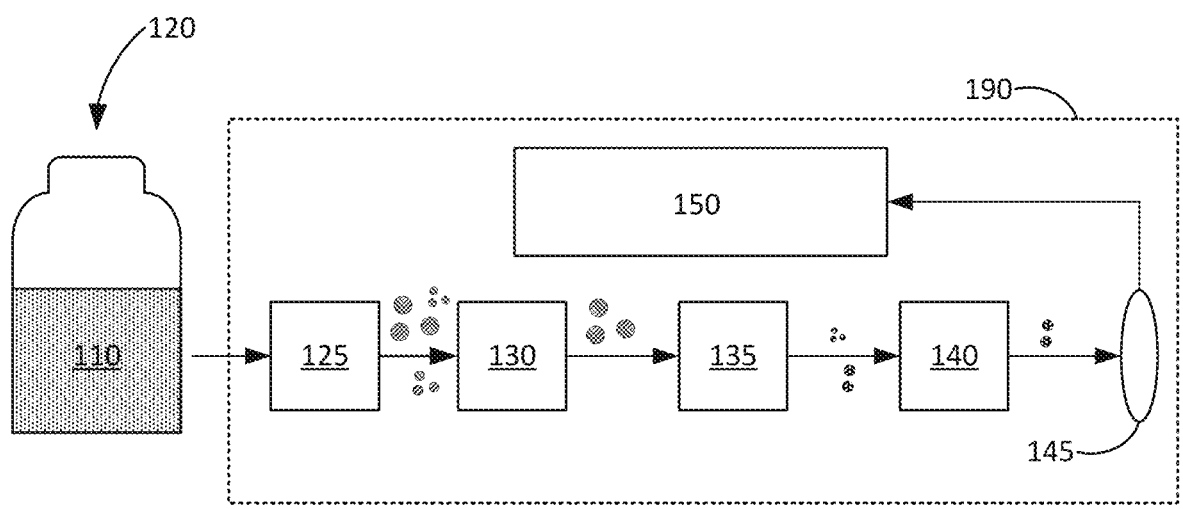
FIG. 1 illustrates an example of a calibrant liquid stored within a container for calibrating a mass spectrometer.

In more detail, FIG. 1 illustrates an example of a calibrant liquid stored within a container for calibrating a mass spectrometer. In FIG. 1, container 120 stores calibrant liquid 110 that is used to calibrate mass spectrometer 190. During the calibration process, calibrant liquid 110 is dispensed from container 120 to ion source 125. Ion source 125 can be of many different ion source types, but in the example of electrospray ionization (ESI), the molecules are ionized to form precursor ions. The ESI source can ionize a sample under analysis by removing or adding charge-carrying entities (e.g., hydrogen nuclei or electrons) to or from the sample to provide the sample with a positive or negative charge.

The precursor ions are then transported via ion optics to mass selector 130. Mass selector 130 may take the form, in one example, of a quadrupole mass filter in which the amplitudes of the radio-frequency (RF) and resolving direct current (DC) voltages are adjusted such that only ions within a narrow range of m/z values are transmitted. Alternatively, mass selector 130 may be any suitable device capable of isolating ions within a mass-to-charge ratio (m/z) window of interest, such as an analytical ion trap or time-of-flight (TOF) mass analyzer. As depicted in FIG. 1, some of the precursor ions of the calibrant liquid are thus mass selected and passed onwards to fragmentation cell 135. In other words, some of the precursor ion species are mass isolated.

Fragmentation cell 135 receives the precursor ions from mass analyzer 130 and fragments, or breaks up, the precursor ions into smaller product ions. Fragmentation is often performed on larger molecules to allow for more detailed understanding of the structural composition. Fragmentation cell 135 can be implemented using many different types of disassociation techniques including collision-induced disassociation (CID), surface-induced dissociation (SID), electron-capture dissociation (ECD), electron-transfer dissociation (ETD), negative electron-transfer dissociation (NETD), electron-detachment dissociation (EDD), photodissociation, higher-energy C-trap dissociation (HCD), etc.

Next, the resulting product ions are subjected to mass analysis to yield an experimental mass spectrum. For example, in FIG. 1, the product ions formed by fragmentation cell 135 are provided to a mass analyzer 140, mass separated, and then provided to detector 145. Mass analyzer 140 can be any suitable device for separating ions according to their mass-to-charge ratios, including (without limitation) an orbital electrostatic trap, analytical quadrupole ion trap, Fourier Transform-Ion Cyclotron Resonance (FT-ICR) analyzer, TOF mass analyzer, or a quadrupole mass filter.

In some implementations, detector 145 detects induced charge or current produced when the product ions provided by mass analyzer 140 pass by or hit a surface of detector 145. Thus, detector 145 generates signals representative of the m/z of the product ions. These signals are provided to controller circuit 150, which then generates a mass spectrum using the detected signals. Because the makeup of calibrant liquid 110 is known, and the theoretical mass spectrum is also known, the experimental mass spectrum generated using controller circuit 150 is compared to the theoretical mass spectrum, and any shifts to align the m/z range to the proper settings are performed. Thus, mass spectrometer is calibrated to provide more accurate results.

In the example of FIG. 1, the mass spectrometer is a tandem mass spectrometer configured to implement a single stage of mass isolation and fragmentation, as indicated with the arrangement of fragmentation cell 135 between mass selector 130 and mass analyzer 140. This is often referred to as MS/MS or MS2 mass spectrometry. In certain implementations, it may be desirable to perform further stages of isolation and fragmentation of generations of product ions (e.g., MS3, MS4, MS5, etc. wherein n is a positive integer). In such cases, the components of the mass spectrometer may be configured to cause the additional isolation/fragmentation operations. For example, mass analyzer 140 may be an analytical quadrupole ion trap mass analyzer that, in addition to performing the mass separation function for acquiring mass spectra, is also capable of executing steps of mass isolation and fragmentation. However, other types of mass spectrometers other than tandem mass spectrometers can also be used.

Figure 2:
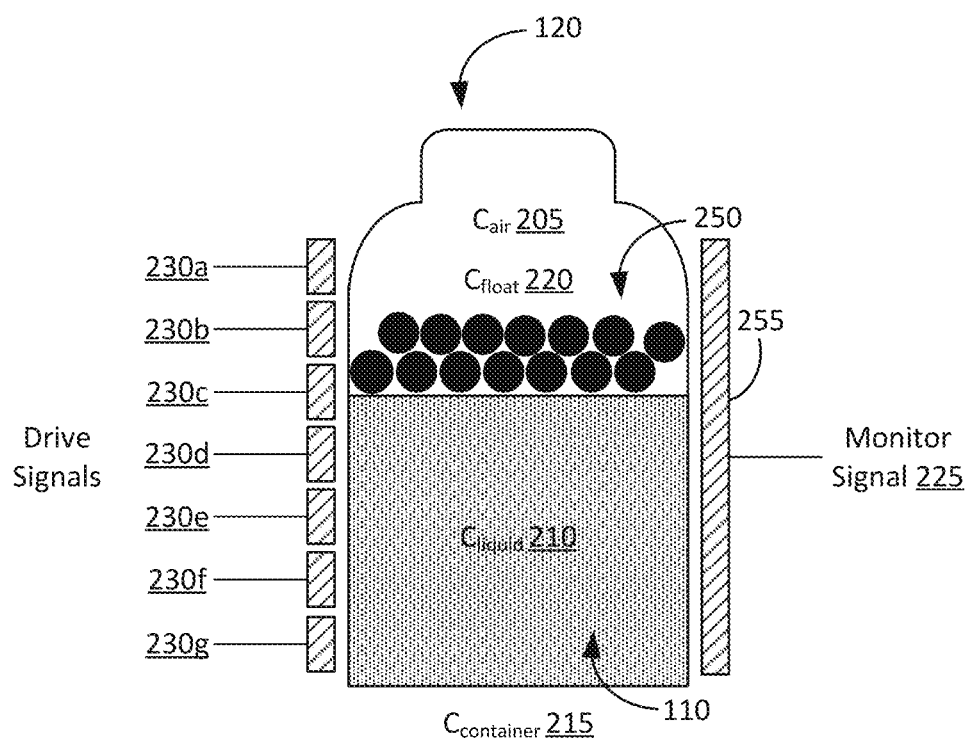
FIG. 2 illustrates an example of a container storing a liquid and a floating layer to facilitate the measurement of the level of the liquid within the container.

The determination of the level of the calibrant liquid used to calibrate the mass spectrometer is enabled via the use of a conductive layer floating upon the calibrant liquid, and an arrangement of electrodes around the container holding the calibrant liquid. FIG. 2 illustrates an example of a container storing a liquid and a floating layer to facilitate the measurement of the level of the liquid within the container. In FIG. 2, container 120 stores conductive layer 250 floating upon calibrant liquid 110. Measure electrodes 230*a-g* are driven via drive signals, and monitor electrode 255 generates monitor signal 225. As described below, conductive layer 250 enables a capacitive coupling such that drive signals applied to measure electrodes 230*a-g* can be changed and affect monitor signal 225 to determine the level of calibrant liquid 110.

Figure 3:
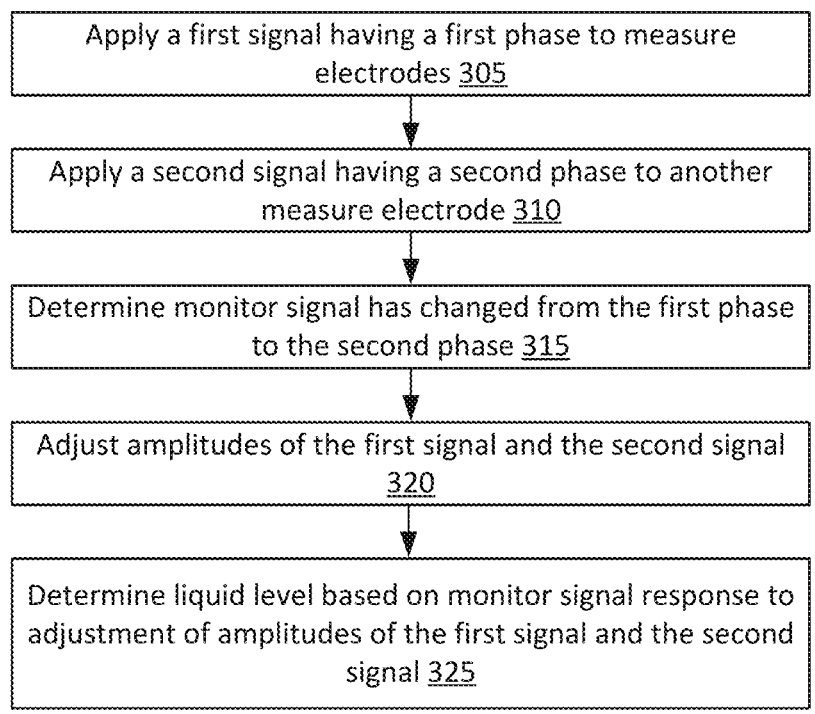
FIG. 3 illustrates an example of a block diagram of measuring the level of a liquid within a container.

The drive signals and monitoring of monitor signal 225 is done in a two-step technique. FIG. 3 illustrates an example of a block diagram of measuring the level of a liquid within a container. In FIG. 3, the first step of the two-step technique is a coarse (or less accurate) level measurement of the calibrant liquid by identifying which of the two measure electrodes 230*a-g* are arranged around the level. At the start, in FIG. 3, a first signal having a first phase is applied to measure electrodes (305). For example, in FIG. 2, each of measure electrodes 230*a-g* are applied one or more signals (e.g., a sinusoidal signal or other oscillating signal at a particular frequency) having a reference phase A. On monitor electrode 255, monitor signal 225 would exhibit similar signal characteristics, for example, similar frequency and phase, but with reduced amplitude. This is achieved via capacitive coupling enabled by conductive layer 250.

Next, in FIG. 3, a second signal having a second phase is applied to one of the measurement electrodes (310) and the monitor signal is identified when it changes from the first phase to the second phase (315). For example, in FIG. 2, beginning with the top measure electrode 230*a*, a second signal having a second phase B that is 180 degrees out-of-phase from the reference phase A of the first signal that is applied to measure electrode 230*a*. The second signal (or another representative signal) is applied sequentially to each of the measure electrodes 230*a-g* while monitoring electrode 255 for a switch from having a signal with the A phase to the B phase. At the point when the switch of the phase from A to B on monitor signal 225 is identified, a coarse level of the level of the calibrant liquid is identified. For example, if the switch occurs when measure electrodes 230*a-c* are driven with a signal having the B phase, and then subsequently measure electrode 230*d* is switched to be driven with a signal having the B phase from the A phase and the phase on monitor signal 225 changes from A to B, then this indicates that the level of the calibrant liquid is between measure electrodes 230*c* and 230*d*. At this point, measure electrodes 230*a-d* are driven with signals having the B phase, and the remaining measure electrodes 230*e-g* are still driven with signals having the A phase.

Next, the second step of the two-step technique is started to identify a more precise, fine level of the calibrant liquid between measure electrodes 230*c* and 230*d*. This starts, in FIG. 3, by adjusting amplitudes of the first signal and the second signal (320). For example, the first signal having the A phase is applied to measure electrode 230*c* (i.e., above the level of the calibration liquid), and the second signal having the B phase is applied to measure electrode 230*d* (i.e., below the level of the calibration liquid).

The amplitudes of the two signals are then varied differentially. For example, the phase of monitor signal 225 (from monitor electrode 255) is identified. If the phase is the A phase, then the amplitude of the signal driving electrode 230*c* is decreased in amplitude. If the phase of monitor signal 225 is the B phase, then the amplitude of the signal driving electrode 230*d* is increased in amplitude. Thus, over a period of time, the signal with the A phase applied above the liquid level will decrease in amplitude, and the signal with the B phase applied below the liquid level will increase in amplitude. Eventually, the phase of monitor signal 225 will oscillate back-and-forth between A phase and B phase, resulting in the amplitudes of the drive signals to the two electrodes also oscillating within narrow bands.

Next, the liquid level is determined in response to the aforementioned monitor signal and adjustments to the amplitudes (325). At this point, the inverse of the of the ratio of the amplitudes of the signals applied to measure electrodes 230*c* and 230*d* indicate the level of the calibrant liquid between the two electrodes. For example, if the amplitude of the second signal having the B phase applied to measure electrode 230*d* is three times higher than the amplitude of the first signal having the A phase applied to measure electrode 230*c*, then the portion of conductive layer 250 overlapping measure electrode 230*d* is one-third the area of the portion overlapping with measure electrode 230*c*. That is, the level of calibrant liquid 110 has dropped to one-fourth of the way from being completely covered by electrode 230*c* (i.e., the electrode that is above the level of the calibrant liquid 110). Thus, the position of conductive layer 110 is identified, which is also the level of calibrant liquid 110.

If the liquid level is sufficient, the calibrant liquid 110 is used to generate a calibration mass spectrum which indicates the m/z values of components of the calibrant liquid 110. Adjustments can be made to software or hardware of the mass spectrometer such that the m/z range of future mass spectra are properly aligned to the m/z values of the calibration mass spectrum.

In some implementations, the amplitudes of the two signals are varied using a digital potentiometer or a multiplying digital-to-analog converter (DAC). For example, if the digital potentiometer or the multiplying DAC are 8-bit, then a counter set to an initial value of 255 is used to control the amplitude for the signal set at the A phase above the level of calibrant liquid 110, and another counter set to an initial value of 0 is used to control the amplitude of the signal set at the B phase below the level of calibrant liquid 110. These counters are incremented or decremented to vary the amplitudes. Thus, the counters would eventually oscillate back-and-forth as well.

Thus, the first step of the technique identifies which two electrodes that the level of calibrant liquid 110 is in between. The second step of the technique then identifies precisely where between the two electrodes that the level of calibrant liquid 110 is between the two electrodes. The second step can also be referred to as "floating a null" because the amplitude of monitor signal 225 will eventually be zero (or approximately zero due to noise).

The technique allows for precise measurement of the level of calibrant liquid 110. For example, in FIG. 2, $C_{container}$ 215 is the capacitance of container 120, and stays relatively constant. $C_{liquid}$ 210 is the capacitance of calibrant liquid 110 and $C_{air}$ 205 is the capacitance of the air within container 120 (i.e., the portion within container 120 that is not the calibrant liquid) would fluctuate as the calibrant liquid is dispensed and, therefore, vary over time. However, if $C_{container}$ 215 is about 20 picofarads (pF) and $C_{liquid}$ 210 when at the full or maximum level is 2 pF, then the change from the maximum level to the minimum level is 2 pF, or 22 pF to 20 pF. Because this 2 pF change must be identified on top of the 20 pF of the container, the resolution of the level of the calibrant liquid is difficult to precisely measure. Additionally, $C_{container}$ 215 can vary among containers due to process variations in manufacturing such as the size or thickness of the container or slight changes in electrode arrangement (e.g., different amounts of air space between the electrodes and container). Under prior techniques (and in contrast to the techniques described herein), it can be difficult, or even impossible, to identify when the container is empty. $C_{float}$ 220 is the capacitance of conductive layer 110 and would also add with $C_{liquid}$ 210 to affect the resolution level.

Conductive layer 250 in FIG. 2 is depicted as spherical beads. In one example, the spherical beads may be gold-shelled polystyrene particles. The vertical height of conductive layer 250 can be close to the height of one of measure electrodes 230a-g to provide an accurate level of measurement. In this configuration, if conductive layer 250 eventually settles upon the bottom of container 120, then it would overlap fully with measure electrode 230g.

However, other shapes and configurations can be utilized as long as the density of conductive layer 250 is lower than the density of calibrant liquid 110. Having a lower density ensures that conductive layer 250 will float upon calibrant liquid 110. In another example, conductive material can be enveloped or contained in another material such that the conductive layer floats as a single piece.

If conductive layer 250 is composed of beads or particles, then calibrant liquid 110 can be dispensed into the mass spectrometer by positioning a syringe or other type of fluid handling system through conductive layer 250 and close to the bottom of container 120. The beads will be slightly displaced to allow the syringe through, but still be able to provide the appropriate capacitive coupling to enable the techniques described herein.

Figure 4:
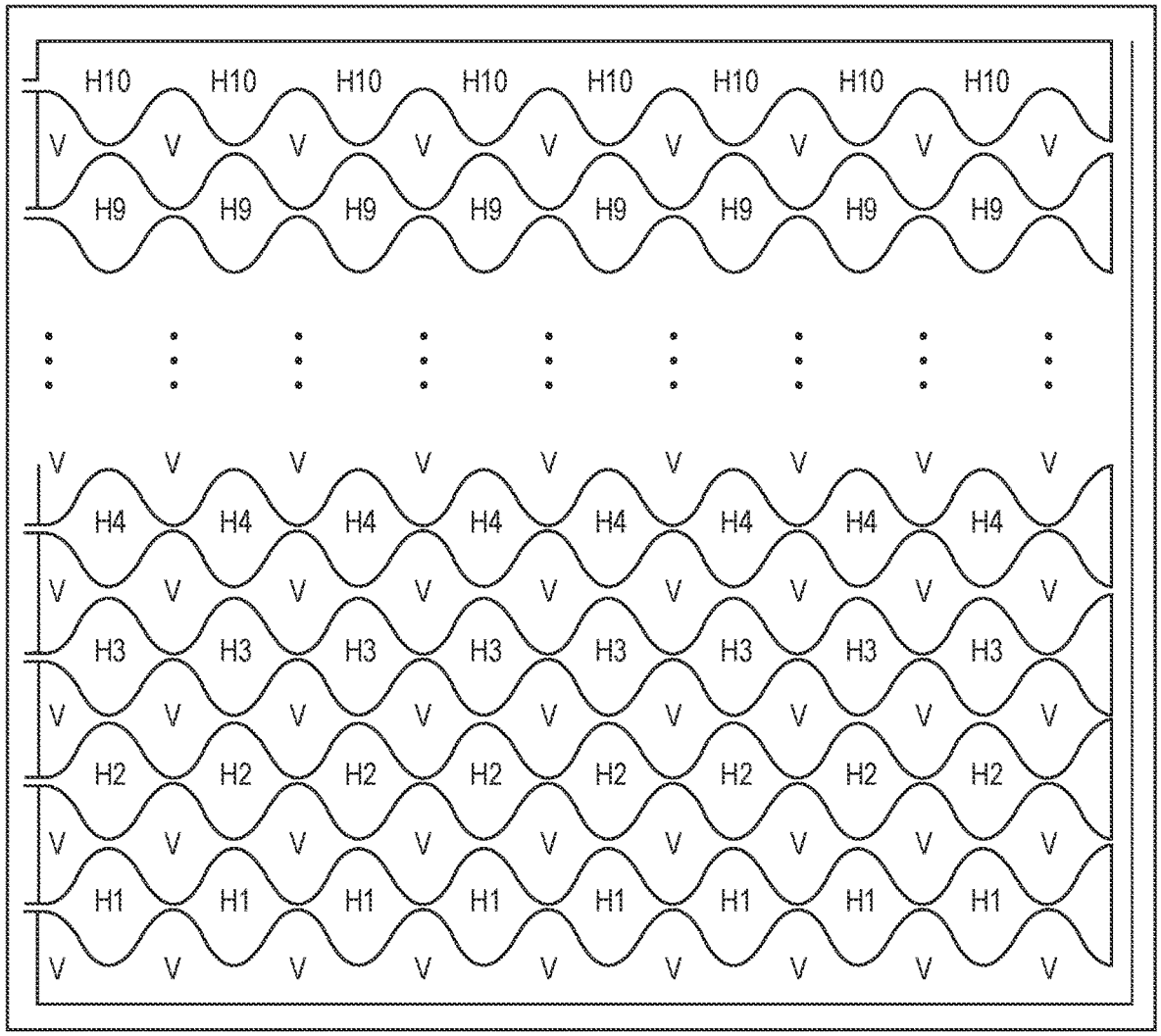
FIG. 4 illustrates an example of electrodes to facilitate measurement of the level of the liquid within the container.

Measure electrodes 230a-g can be arranged horizontally around the container 120, and monitor electrode 255 can be interleaved between measure electrodes 230a-g. For example, FIG. 4 illustrates electrodes to facilitate measurement of the level of the liquid within the container. In FIG. 4, H1-H10 are horizontal electrodes depicted measure electrodes 230a-g and V represents monitor electrode 255. Interleaved between each measure electrodes 230a-g (i.e., H1-H10), a portion of monitor electrode 255 is positioned (i.e., V). Each of the interleaved portions of monitor electrode 255 are coupled together via a vertical portion on the right-side to form monitor electrode 255. Thus, parts of the electrodes form diamond-shaped parts (e.g., the thicker parts) that are coupled to a subsequent diamond-shaped part via a thinner strip. The design of the electrodes in FIG. 4 allows for improved sensitivity.

Measure electrodes 230a-g and monitor electrode 255 can be printed upon container 120, or can be printed or disposed upon a flexible substrate, for example, a flexible printed circuit board (PCB) that is curved such that container 120 can be placed in the middle of the flexible PCB. If the flexible PCB is wrapped tightly around container 120 such that low amount of air is in between the electrodes and the bottle, then the techniques described herein can be adequately employed. Using the flexible PCB also allows for lower cost as container 120 can be cheaper to manufacture without electrodes printed upon it.

The signals used to drive the various electrodes described herein can be provided by controller circuit 115, or by other circuits controlled by controller circuit 115.

The examples described herein include a calibrant liquid for mass spectrometer. However, other types of liquids can be used. For example, a liquid sample for experimental analysis can be used. Additionally, the techniques described herein can be used in applications other than mass spectrometry.

Figure 5:
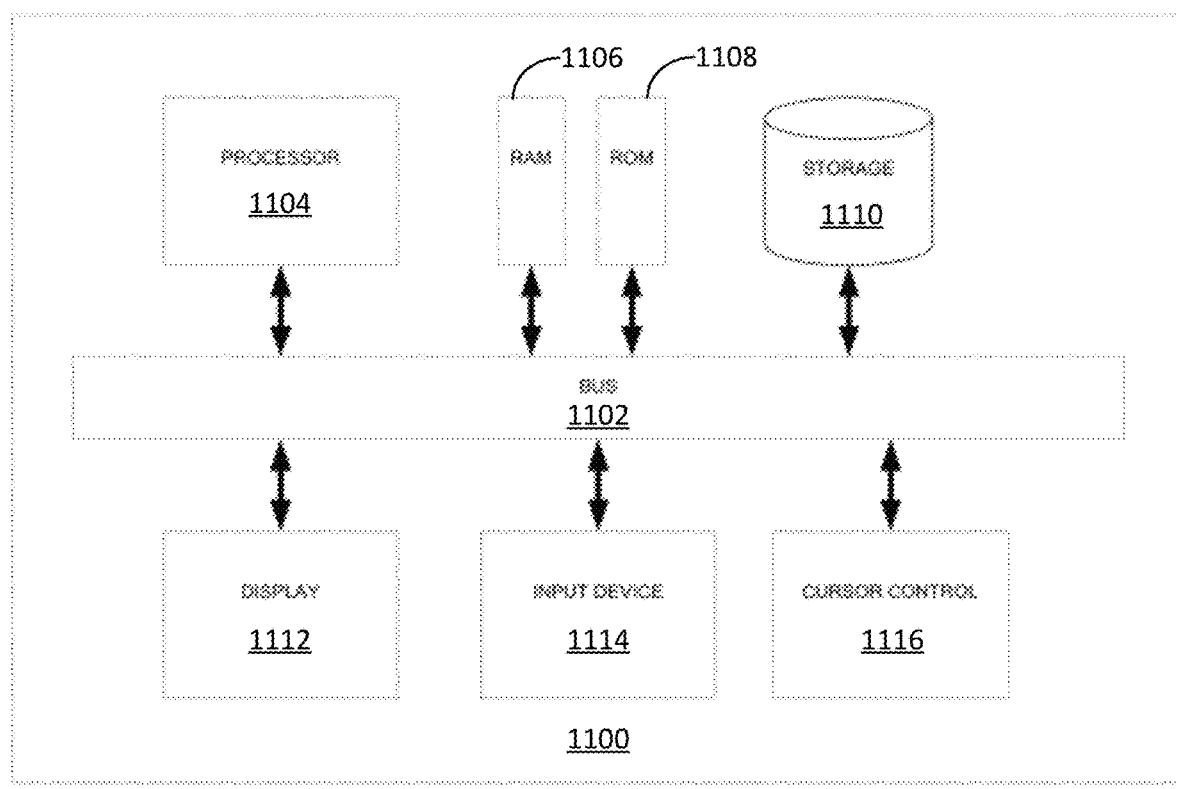
FIG. 5 illustrates an example of an electronic device which may be used to implement some of the examples.

FIG. 5 illustrates an example of an electronic device which may be used to implement some of the examples. For example, the electronic device in FIG. 5 can be a circuit such as controller circuit 150 in FIG. 1, and controller circuit 150 can be used to generate control signals to drive the electrodes, measure monitor signal 225, and determine the level of the calibrant liquid 110 based on the position of conductive layer 250. If the level is below a threshold, then an operator may be alerted (e.g., via a graphical user interface (GUI) on a display screen) that container 120 might soon need to be replaced.

The electronic device of FIG. 5 can store or use a computer program product including one or more non-transitory computer-readable media having computer programs instructed stored therein, the computer program instructions being configured such that, when executed by one or more computing devices, the computer program instructions cause the one or more computing devices to perform the techniques described herein.

In FIG. 5, computer system 1100 can implement any of the methods or techniques described herein. For example, as previously discussed, computer system 1100 can implement controller 150 in FIG. 1. Thus, the operation of components of the associated mass spectrometer may be adjusted in accordance with calculations or determinations made by computer system 1100. In various embodiments, computer system 1100 can include a bus 1102 or other communication mechanism for communicating information, and a processor 1104 coupled with bus 1102 for processing information. In various embodiments, computer system 1100 can also include a memory 1106, which can be a random-access memory (RAM) or other dynamic storage device, coupled to bus 1102, and instructions to be executed by processor 1104. Memory 1106 also can be used for storing temporary variables or other intermediate information during execution of instructions to be executed by processor 1104. In various embodiments, computer system 1100 can further include a read only memory (ROM) 1108 or other static storage device coupled to bus 1102 for storing static information and instructions for processor 1104. A storage device 1110, such as a magnetic disk or optical disk, can be provided and coupled to bus 1102 for storing information and instructions.

In various embodiments, computer system 1100 can be coupled via bus 1102 to a display 1112, such as a cathode ray tube (CRT) or liquid crystal display (LCD), for displaying information to a computer user. An input device 1114, including alphanumeric and other keys, can be coupled to bus 1102 for communicating information and command selections to processor 1104. Another type of user input device is a cursor control 1116, such as a mouse, a trackball or cursor direction keys for communicating direction information and command selections to processor 1104 and for controlling cursor movement on display 1112. This input device typically has two degrees of freedom in two axes, a first axis (i.e., x) and a second axis (i.e., y), that allows the device to specify positions in a plane.

A computer system 1100 can perform the techniques described herein. Consistent with certain implementations, results can be provided by computer system 1100 in response to processor 1104 executing one or more sequences of one or more instructions contained in memory 1106. Such instructions can be read into memory 1106 from another computer-readable medium, such as storage device 1110. Execution of the sequences of instructions contained in memory 1106 can cause processor 1104 to perform the processes described herein. In various embodiments, instructions in the memory can sequence the use of various combinations of logic gates available within the processor to perform the processes describe herein. Alternatively, hard-wired circuitry can be used in place of or in combination with software instructions to implement the present teachings. In various embodiments, the hard-wired circuitry can include the necessary logic gates, operated in the necessary sequence to perform the processes described herein. Thus, implementations described herein are not limited to any specific combination of hardware circuitry and software.

The term "computer-readable medium" as used herein refers to any media that participates in providing instructions to processor 1104 for execution. Such a medium can take many forms, including but not limited to, non-volatile media, volatile media, and transmission media. Examples of non-volatile media can include, but are not limited to, optical or magnetic disks, such as storage device 1110. Examples of volatile media can include, but are not limited to, dynamic memory, such as memory 1106. Examples of transmission media can include, but are not limited to, coaxial cables, copper wire, and fiber optics, including the wires that comprise bus 1102.

Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

In various embodiments, the methods of the present teachings may be implemented in a software program and applications written in conventional programming languages such as C, C++, etc.

While the techniques are described in conjunction with various implementations or embodiments, it is not intended that the techniques be limited to such embodiments. On the contrary, the techniques encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

We claim:

1. A method of calibrating a mass spectrometer, comprising:

applying first signals having a first phase to a first measure electrode and a second measure electrode, the first and second measure electrodes arranged around a container holding a calibrant liquid and a conductive layer floating upon the calibrant liquid, the conductive layer capacitively coupled with the first and second measure electrodes, and a density of the conductive layer being lower than a density of the calibrant liquid;

applying second signals having a second phase different than the first phase to the first and second measure electrodes;

determining that a monitor signal from a monitor electrode capacitively coupled with the conductive floating layer has changed from the first phase to the second phase upon application of the second signal to the second measure electrode;

identifying the first measure electrode being above a level of the calibrant liquid, and the second measure electrode being below the level of the calibrant liquid upon the determination that the monitor signal has changed from the first phase to the second phase;

applying a third signal having the first phase to the first measure electrode, and a fourth signal having the second phase to the second measure electrode;

identifying the level of the calibrant liquid between the first measure electrode and the second measure electrode by differentially adjusting an amplitude of the third signal and an amplitude of the fourth signal until a phase of the monitor signal oscillates between the first phase and the second phase; and generating a calibration mass spectrum indicative of components of the calibrant liquid to facilitate calibration of the mass spectrometer; and calibrating the mass spectrometer based on the calibration mass spectrum.

2. The method of claim 1, wherein the conductive layer includes conductive beads.

3. The method of claim 2, wherein the conductive beads include gold-shelled polystyrene particles.

4. The method of claim 1, wherein the first phase and the second phase are approximately 180 degrees out of phase with each other.

5. The method of claim 1, wherein the amplitude of the third signal is decreased, and the amplitude of the fourth signal is increased when differentially adjusting the amplitudes.

6. The method of claim 1, wherein the level of the calibrant liquid between the first measure electrode and the second measure electrode is an inverse of a ratio of the amplitudes.

7. An apparatus for determining a level of a liquid in a container, comprising:
a container having a conductive layer floating upon a liquid;
a circuit board disposed around the container, and having measure electrodes and a monitor electrode arranged around the container; and
a controller circuit configured to drive the measure electrodes and measure a monitor signal provided by the monitor electrode to identify a first electrode and a second electrode that a level of the liquid is in between, and further identify a location between the first electrode and the second electrode that the level of the liquid is at.

8. The apparatus of claim 7, wherein identifying the first electrode and the second electrode that the level of the liquid is in between includes determining the monitor signal switched from a first phase to a second phase when a signal applied to the second electrode switches from the first phase to the second phase, the second electrode being below the level of the liquid, and the first electrode being above the level of the liquid.

9. The apparatus of claim 7, wherein identifying the location between the first electrode and the second electrode that the level of the liquid is at includes adjusting an amplitude a signal applied to the first electrode and an amplitude of a signal applied to the second electrode until a phase of the monitor signal oscillates between the first phase and the second phase.

10. The apparatus of claim 9, wherein the amplitude of the signal applied to the first electrode is decreased, and the amplitude of the signal is increased when adjusting the amplitudes.

11. The apparatus of claim 7, wherein the conductive layer includes conductive beads.

12. The apparatus of claim 11, wherein the conductive beads include gold-shelled polystyrene particles.

13. The apparatus of claim 11, wherein the liquid is a calibrant liquid for calibrating a mass spectrometer.

14. An apparatus for determining a level of a liquid in a container, comprising
a circuit board configured to wrap around a container having a conductive layer floating upon a liquid, and configured to have electrodes disposed around the container; and
a controller circuit configured to drive the electrodes and identify a first electrode and a second electrode that a level of the liquid is in between, and further identify a location between the first electrode and the second electrode that the level of the liquid is at after identifying the first electrode and the second electrode.

15. The apparatus of claim 14, wherein identifying the first electrode and the second electrode that the level of the liquid is in between includes determining a signal at an electrode that is capacitively coupled to the conductive layer has switched from a first phase to a second phase when a signal applied to the second electrode switches from the first phase to the second phase, the second electrode being below the level of the liquid, and the first electrode being above the level of the liquid.

16. The apparatus of claim 14, wherein identifying the location between the first electrode and the second electrode that the level of the liquid is at includes adjusting an amplitude a signal applied to the first electrode and an amplitude of a signal applied to the second electrode until a phase of a monitor signal oscillates between the first phase and the second phase.

17. The apparatus of claim 16, wherein the amplitude of the signal applied to the first electrode is decreased, and the amplitude of the signal is increased when adjusting the amplitudes.

18. The apparatus of claim 14, wherein the conductive layer includes conductive beads.

19. The apparatus of claim 18, wherein the conductive beads include gold-shelled polystyrene particles.

20. The apparatus of claim 18, wherein the liquid is a calibrant liquid for calibrating a mass spectrometer.

* * * * *